United States Patent
Goddard

(10) Patent No.: US 10,602,745 B2
(45) Date of Patent: Mar. 31, 2020

(54) FOOD PREPARATION APPARATUS FOR SLICED PIZZA AND METHOD OF USE THEREOF

(71) Applicant: Mark A. Goddard, Charlotte, NC (US)

(72) Inventor: Mark A. Goddard, Charlotte, NC (US)

(*) Notice: Subject to any disclaimer, the term of this patent is extended or adjusted under 35 U.S.C. 154(b) by 0 days.

(21) Appl. No.: 16/111,744

(22) Filed: Aug. 24, 2018

(65) Prior Publication Data

US 2020/0029581 A1 Jan. 30, 2020

Related U.S. Application Data

(60) Provisional application No. 62/712,200, filed on Jul. 30, 2018.

(51) Int. Cl.
| | | |
|---|---|---|
| *A47G 21/00* | (2006.01) |
| *A21C 15/04* | (2006.01) |
| *A47J 43/28* | (2006.01) |
| *A21D 13/41* | (2017.01) |
| *A47G 21/04* | (2006.01) |

(52) U.S. Cl.
CPC .............. *A21C 15/04* (2013.01); *A21D 13/41* (2017.01); *A47J 43/283* (2013.01); *A47G 21/045* (2013.01)

(58) Field of Classification Search
CPC ........ A21C 15/04; A21D 13/41; A47J 43/283; A47G 21/045
See application file for complete search history.

(56) References Cited

U.S. PATENT DOCUMENTS

| | | | | |
|---|---|---|---|---|
| 433,546 | A * | 8/1890 | Smith | B65G 7/12 |
| | | | | 294/15 |
| 461,623 | A * | 10/1891 | Schoch | B05B 11/3074 |
| | | | | 222/340 |
| 731,417 | A | 6/1903 | Thorne | |
| D39,441 | S * | 8/1908 | Bain | A47G 21/045 |
| | | | | 294/15 |
| 952,313 | A * | 3/1910 | Droz | B67C 11/02 |
| | | | | 141/98 |
| 1,130,234 | A * | 3/1915 | Wladyslaw | A47J 37/10 |
| | | | | 294/7 |
| 1,526,397 | A | 2/1924 | Thornton | |
| 1,544,231 | A * | 6/1925 | Hobbs | A47J 45/10 |
| | | | | 294/32 |
| 2,039,830 | A * | 5/1936 | Owens | A23G 9/503 |
| | | | | 229/101.1 |

(Continued)

OTHER PUBLICATIONS

Pizza Reheating Tray for Microwave, manufactured by Jobar Internatinal sold by Black Duck Deals, found on Amazon.com, Jul. 6, 2018 (first listed on Amazon: Feb. 16, 2016) https://www.amazon.com/gp/product/B01BUI9286/?tag=bakeware101a-20&pij=030617064024.

(Continued)

*Primary Examiner* — Steven N Leff
(74) *Attorney, Agent, or Firm* — Maier & Maier, PLLC

(57) ABSTRACT

A food preparation apparatus for a slice includes a flat bottom and raised side members. The flat bottom is shaped like the slice with two angled sides and an open end. The open end connects the two angled sides. The open end is also straight. Raised side members are on the two angled sides. Wherein, the food preparation apparatus is configured to hold the slice on the bottom where the raised side members are configured to retain the slice and toppings on the food preparation apparatus.

6 Claims, 9 Drawing Sheets

(56) References Cited

U.S. PATENT DOCUMENTS

| | | | | |
|---|---|---|---|---|
| 2,182,726 A * | 12/1939 | King | B26B 27/00 | |
| | | | 294/7 | |
| 2,452,969 A | 11/1948 | Victor | | |
| 2,460,887 A * | 2/1949 | Kriz, Jr. | A47J 43/28 | |
| | | | 294/7 | |
| 2,497,005 A * | 2/1950 | McConnell | A47J 45/10 | |
| | | | 294/32 | |
| 2,589,753 A | 3/1952 | Vinson | | |
| 2,818,784 A * | 1/1958 | Stevens | F41A 9/27 | |
| | | | 89/155 | |
| 2,987,749 A * | 6/1961 | Gartner | A47L 13/52 | |
| | | | 15/144.1 | |
| D195,524 S | 6/1963 | Patton, Jr. et al. | | |
| 3,335,846 A * | 8/1967 | Mills | B65D 11/02 | |
| | | | 206/550 | |
| 3,355,082 A * | 11/1967 | Wood | A47G 21/001 | |
| | | | 206/815 | |
| D225,254 S * | 11/1972 | Meaney | A47G 21/045 | |
| | | | 30/303 | |
| 3,771,713 A * | 11/1973 | Davidson | B65D 5/48004 | |
| | | | 206/551 | |
| 3,931,925 A * | 1/1976 | Ruff | A47G 21/04 | |
| | | | 229/125.03 | |
| 4,205,870 A * | 6/1980 | Conner | A47J 43/283 | |
| | | | 294/7 | |
| D260,722 S * | 9/1981 | Bateman | D7/691 | |
| D267,592 S * | 1/1983 | Payne, Jr. | D32/74 | |
| D281,107 S * | 10/1985 | Lordi | D30/162 | |
| 4,729,589 A * | 3/1988 | Puskar | A47J 43/28 | |
| | | | 294/26.5 | |
| 4,811,846 A * | 3/1989 | Bottega | B65D 1/34 | |
| | | | 206/542 | |
| 4,836,593 A * | 6/1989 | Cooley | A47G 21/001 | |
| | | | 206/525 | |
| D326,034 S * | 5/1992 | Kluesner | A47G 21/045 | |
| | | | 294/7 | |
| 5,165,171 A * | 11/1992 | MacLean | A47G 21/045 | |
| | | | 294/7 | |
| D336,589 S | 6/1993 | Schindler | | |
| 5,526,569 A | 6/1996 | Ancona | | |
| D391,808 S | 3/1998 | Voege | | |
| D395,928 S * | 7/1998 | Freelander | D21/532 | |
| 5,903,981 A * | 5/1999 | Grow, II | A47G 21/045 | |
| | | | 30/114 | |
| D419,364 S | 1/2000 | Jarvis | | |
| D426,754 S * | 6/2000 | Kim | D7/688 | |
| 6,150,635 A | 11/2000 | Hannon et al. | | |
| 6,287,619 B1 | 9/2001 | Khan | | |
| 6,299,918 B1 * | 10/2001 | Morgese | A47G 21/001 | |
| | | | 206/551 | |
| D463,223 S * | 9/2002 | Bien | D7/688 | |
| 6,783,782 B1 * | 8/2004 | Larsen | A21C 11/12 | |
| | | | 426/144 | |
| D498,989 S * | 11/2004 | White | D7/688 | |
| 7,004,377 B2 * | 2/2006 | Metcalf | A47G 21/001 | |
| | | | 229/101.1 | |
| D519,794 S * | 5/2006 | Roberts | D8/10 | |
| 7,102,111 B2 * | 9/2006 | Metcalf | A47G 21/001 | |
| | | | 219/725 | |
| D563,179 S * | 3/2008 | Minidis | D7/688 | |
| D600,509 S * | 9/2009 | Gross | D7/688 | |
| D601,390 S * | 10/2009 | Kiraly | D7/642 | |
| 7,874,088 B2 | 1/2011 | Nikols | | |
| 8,616,122 B2 * | 12/2013 | Smallegan | A21C 9/068 | |
| | | | 426/138 | |
| D699,506 S | 2/2014 | Lee | | |
| 8,778,435 B2 | 7/2014 | Pokotylo | | |
| 9,498,074 B1 | 11/2016 | Baryshyan | | |
| 9,814,330 B2 | 11/2017 | DiMeo | | |
| 2002/0109362 A1 * | 8/2002 | Long | A47J 43/28 | |
| | | | 294/219 | |
| 2003/0006273 A1 * | 1/2003 | Tsern | B65D 5/2014 | |
| | | | 229/115 | |
| 2003/0034662 A1 * | 2/2003 | Wilson | A47G 21/045 | |
| | | | 294/7 | |
| 2003/0230905 A1 * | 12/2003 | Daniele | A47F 13/08 | |
| | | | 294/212 | |
| 2005/0011074 A1 * | 1/2005 | Mounce | A47G 21/045 | |
| | | | 30/114 | |
| 2006/0130336 A1 * | 6/2006 | Christensen | A47G 21/045 | |
| | | | 30/142 | |
| 2006/0180031 A1 * | 8/2006 | Carlson | A21C 15/04 | |
| | | | 99/352 | |
| 2007/0169636 A1 * | 7/2007 | Carlson | A47G 19/022 | |
| | | | 99/279 | |
| 2007/0261568 A1 | 11/2007 | Smothers | | |
| 2008/0134517 A1 * | 6/2008 | Bosworth | A21C 15/04 | |
| | | | 30/114 | |
| 2008/0203747 A1 * | 8/2008 | Stenglein | A47G 21/045 | |
| | | | 294/7 | |
| 2012/0185086 A1 | 7/2012 | Khatchadourian et al. | | |
| 2012/0210841 A1 | 8/2012 | Getzinger et al. | | |
| 2014/0099418 A1 * | 4/2014 | Getzinger | A47J 47/005 | |
| | | | 426/520 | |
| 2014/0367391 A1 | 12/2014 | Perry et al. | | |
| 2015/0265080 A1 * | 9/2015 | Bagi | A47G 1/001 | |
| | | | 294/172 | |

OTHER PUBLICATIONS

International Search Report and Written Opinion dated Nov. 15, 2019, in corresponding international Appiication No. PCT/US2019/043841 (13 pgs.).

\* cited by examiner

FOOD PREPARATION APPARATUS FOR SLICED PIZZA AND METHOD OF USE THEREOF

CROSS-REFERENCE TO RELATED APPLICATIONS

This application claims benefit of priority application, U.S. Provisional Ser. No. 62/712,200 filed on Jul. 30, 2018 entitled "Pizza Tin for Sliced Pizza", which is incorporated herein by reference in its entirety.

FIELD OF THE DISCLOSURE

The present disclosure relates to food preparation, like cooking, baking and handling. More specifically, the present disclosure is directed to a food preparation apparatus for sliced food, like sliced pizza.

BACKGROUND

Pizza and sliced or slices of pizza are popular food dishes throughout the United States and world. Pizza restaurants and others commonly sell single slices of pizza or miniature pizzas, instead of entire pizza pies, to customers who do not wish to purchase a pizza of substantial size. To create individual slices for retail sale, restaurants typically prepare and bake an entire pizza pie and then cut it into a desired number of individual portions. This presents a number of disadvantages, however. Following this process can waste a substantial amount of food, given the short shelf life of baked pizza products in a commercial sale environment. This process can also result in non-uniform distribution of cheese and toppings on the individual slices, or non-uniformity from slice to slice. Additionally, the substantial mass of an entire pizza pie can adversely affect various baking parameters associated with the single-slice environment, e.g. it can lengthen the baking time required adequately to heat the center of the pie. Other disadvantages will be readily apparent to those of ordinary skill in the art.

Attempts to bake pizza slices individually generally have met with difficulty. Overbaking, excessive browning, hardening, or even burning of individually baked slices are common, especially on the sides of the slice. Placing toppings, like cheese, tomato sauce, meats, vegetables, etc., on individual slices is also somewhat difficult, given the relatively small slice sizes desirable for commercial sale. As such, there is clearly a need to provide a means and method to cook, bake, or even just re-heat single slices of pizza easily and more efficiently. This is especially true if the restaurant wants to serve them quickly, like a fast food restaurant.

Another problem that arises with cooking, baking or re-heating single slices of pizza is handling of the single slice of pizza. Unlike full pizza pies, which can be carried on circular baking sheets or the like, single slices of pizza do not have any pizza tins or the like designed to carry or handle the slice of pizza. In addition, picking up a single slice of pizza and retaining the toppings on the single slice of pizza can be difficult. As such, there is clearly a need for a device and/or method for handling single slices of pizza.

The instant disclosure is designed to address at least certain aspects of the problems or needs discussed above by providing a food preparation apparatus for sliced pizza and method of use thereof.

SUMMARY

Accordingly, in one aspect, the present disclosure embraces a food preparation apparatus for a slice. The slice may be any slice of food, including, but not limited to, a slice of pizza. The food preparation apparatus generally may include a flat bottom with raised side members. The flat bottom may be shaped like the slice of pizza with two angled sides and an open end. The open end may connect the two angled sides. The open end may also be straight. The raised side members may be on the two angled sides. Wherein, the food preparation apparatus may be configured to hold the slice of pizza on the bottom where the raised side members may be configured to retain the slice of pizza and toppings on the food preparation apparatus.

In select embodiments of the instant food preparation apparatus for a slice of pizza, a handle may be included. The handle may be positioned off of a point created by the two angled sides. The handle may also be positioned at tops of the raised side members off of the point created by the two angled sides.

In other select embodiments of the instant food preparation apparatus for a slice of pizza, tops of the raised side members may include edges. The edges on each of the tops may extend outwardly from the bottom. In select embodiments, the edges may include grip portions associated with the handle. The grip portions may be configured to aid in holding the handle. In select embodiments, each of the grip portions may include at least one extended ridge from the edge approximate the handle, where the at least one extended ridge is configured to aid in holding the handle by providing at least one finger grip. In select embodiments, each of the grip portions may include two extended ridges from the edge approximate the handle, where the two extended ridges are configured to aid in holding the handle by providing two finger grips. In select embodiments, the two finger grips may be provided by the two extended ridges of each of the grip portions creating a full concave portion between each extended ridge and a half concave portion.

Another feature of the instant food preparation apparatus for a slice of pizza may be the inclusion of a cap for the handle. The cap may cover the handle. The cap may be configured to join the two sections of the handle together. The cap may also be configured to aid in gripping the handle and may be configured for insulating heat from the handle.

In select embodiments of the instant food preparation apparatus for a slice of pizza, the flat bottom may include a plurality of holes. The plurality of holes on the flat bottom may be for ventilation to aid in cooking, baking or reheating of the slice of pizza.

Another feature of the instant food preparation apparatus for a slice of pizza may be that the combination of the open end positioned on a front side of the food preparation apparatus and the handle positioned on a back side of the food preparation apparatus may create a spatula. As such, the spatula created by the food preparation apparatus may be configured to scoop the slice of pizza into the food preparation apparatus by pushing the open end under a pointed end of the slice of pizza. In select embodiments, the open end may include a lip extending from the raised side members. In other select embodiments, each of the raised side members may include an angled side approximate the open end.

Another feature of the instant food preparation apparatus for a slice of pizza may be that the raised side members can include an opening out of a point created by the two angled sides. The opening at the point may be configured for ventilation and/or drainage.

Another feature of the instant food preparation apparatus for a slice of pizza may be the inclusion of a numbering system. The numbering system may include at least one unique number mark positioned on the handle or one of the edges. The unique number mark may be configured for keeping track of the slice of pizza on the food preparation apparatus.

In another aspect, the instant disclosure embraces a set of food preparation apparatuses for sliced pizza. The set of food preparation apparatuses may include a plurality of the food preparation apparatuses for a slice of pizza in any of the various embodiments shown and/or described herein. As such, each of the plurality of food preparation apparatuses may include a numbering system for the plurality of food preparation apparatuses. The numbering system may include at least one unique number mark positioned on each of the plurality of food preparation apparatuses. The numbering system may be configured for keeping track of the sliced pizza in each of the plurality of food preparation apparatuses.

In select embodiments of the instant set of food preparation apparatuses for sliced pizza, each of the food preparation apparatuses may include a flat bottom and raised side members. The flat bottom may be shaped like the slice of pizza with two angled sides and an open end connecting the two angled sides. The open end may be straight. Raised side members may be on the two angled sides. Wherein, each of the food preparation apparatuses may be configured to hold the slice of pizza on the bottom where the raised side members are configured to retain the slice of pizza and toppings on the food preparation apparatus.

In select embodiments of the instant set of food preparation apparatuses for sliced pizza, each of the food preparation apparatuses may further include a handle off of a point created by the two angled sides. Wherein the at least one unique number mark may be positioned on the handle, one or both of the edges, or a combination thereof. In select embodiments, the at least one unique number mark may be positioned on a cap covering the handle and on both of the edges.

One feature of the instant set of food preparation apparatuses for sliced pizza may be that the numbering system can be configured for keeping track of the sliced pizza in each of the plurality of food preparation apparatuses while it is cooked, baked or reheated in an oven. As examples, and clearly not limited thereto, the oven may be a standard oven or a conveyor oven.

In another aspect, the instant disclosure embraces a method of cooking, baking, or re-heating sliced pizza. The method of cooking, baking, or re-heating sliced pizza of the instant disclosure may generally include the step of providing at least one food preparation apparatus for a slice of the sliced pizza in any of the various embodiments shown and/or described herein. As such, the provided food preparation apparatus or tins may generally include a flat bottom shaped like the slice with two angled sides and an open end connecting the two angled sides. The open end may be straight. Raised side members may be on the two angled sides. Wherein, the provided food preparation apparatus may be configured to hold the slice on the bottom where the raised side members may be configured to retain the slice and toppings on the food preparation apparatus. With this provided food preparation apparatus or these provided food preparation apparatuses, the method may further include: scooping a slice onto the bottom of one of the plurality of food preparation apparatuses between the raised side members; inserting the food preparation apparatus with the slice into an oven; and cooking, baking, or reheating the slice in the oven.

In select embodiments of the instant method of cooking, baking, or re-heating sliced pizza, wherein the at least one food preparation apparatus further including the numbering system for each of the at least plurality of food preparation apparatuses, where the numbering system including at least one unique number mark positioned on each of the plurality of food preparation apparatuses, the numbering system may be configured for keeping track of the sliced pizza in each of the at least one food preparation apparatuses, wherein, the method of cooking, baking, or re-heating sliced pizza may further include keeping track of each of the at least one food preparation apparatuses in the oven via the unique number mark.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
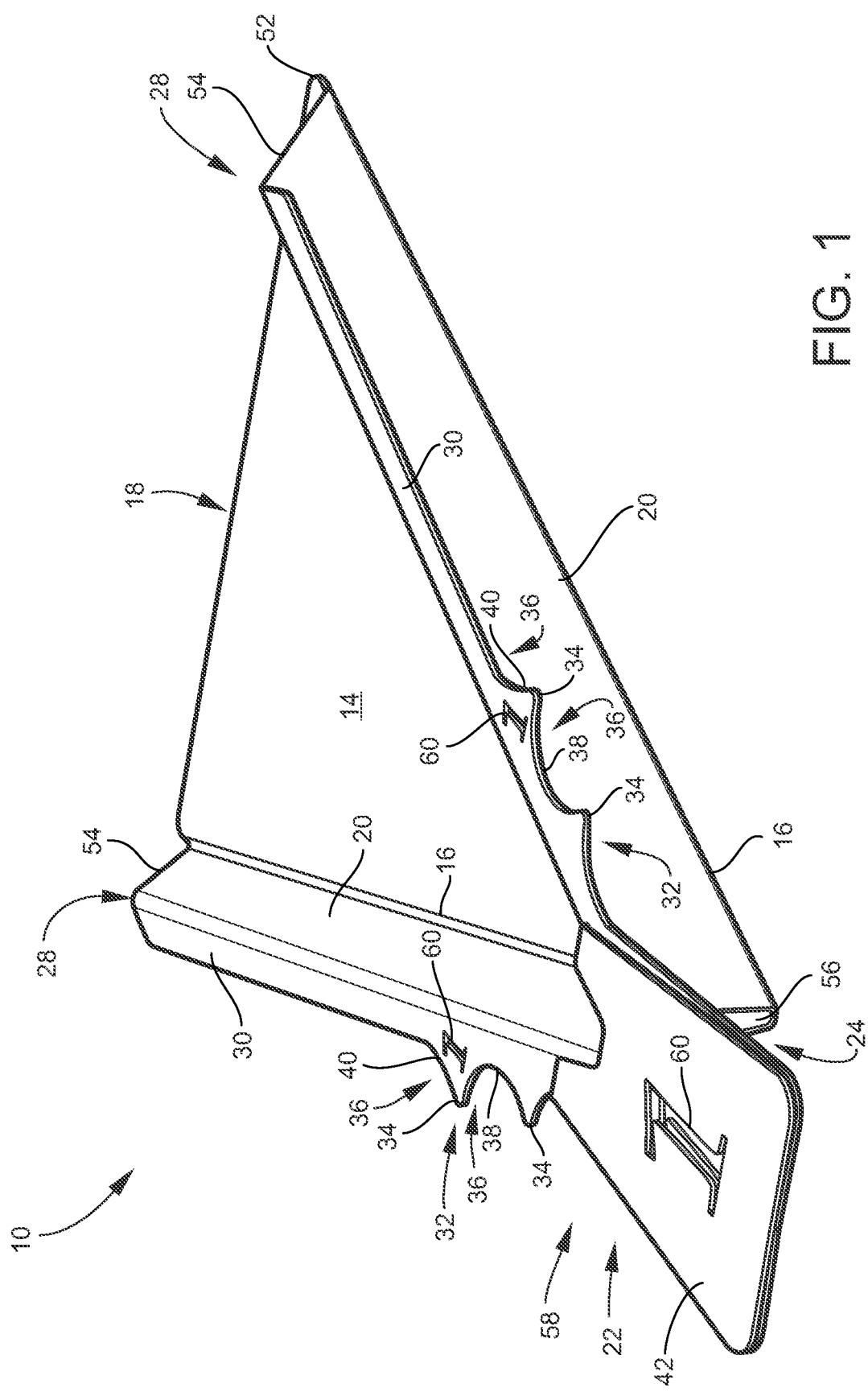
FIG. 1 is a top perspective view of the food preparation apparatus for sliced pizza according to select embodiments of the instant disclosure.
Figure 2:
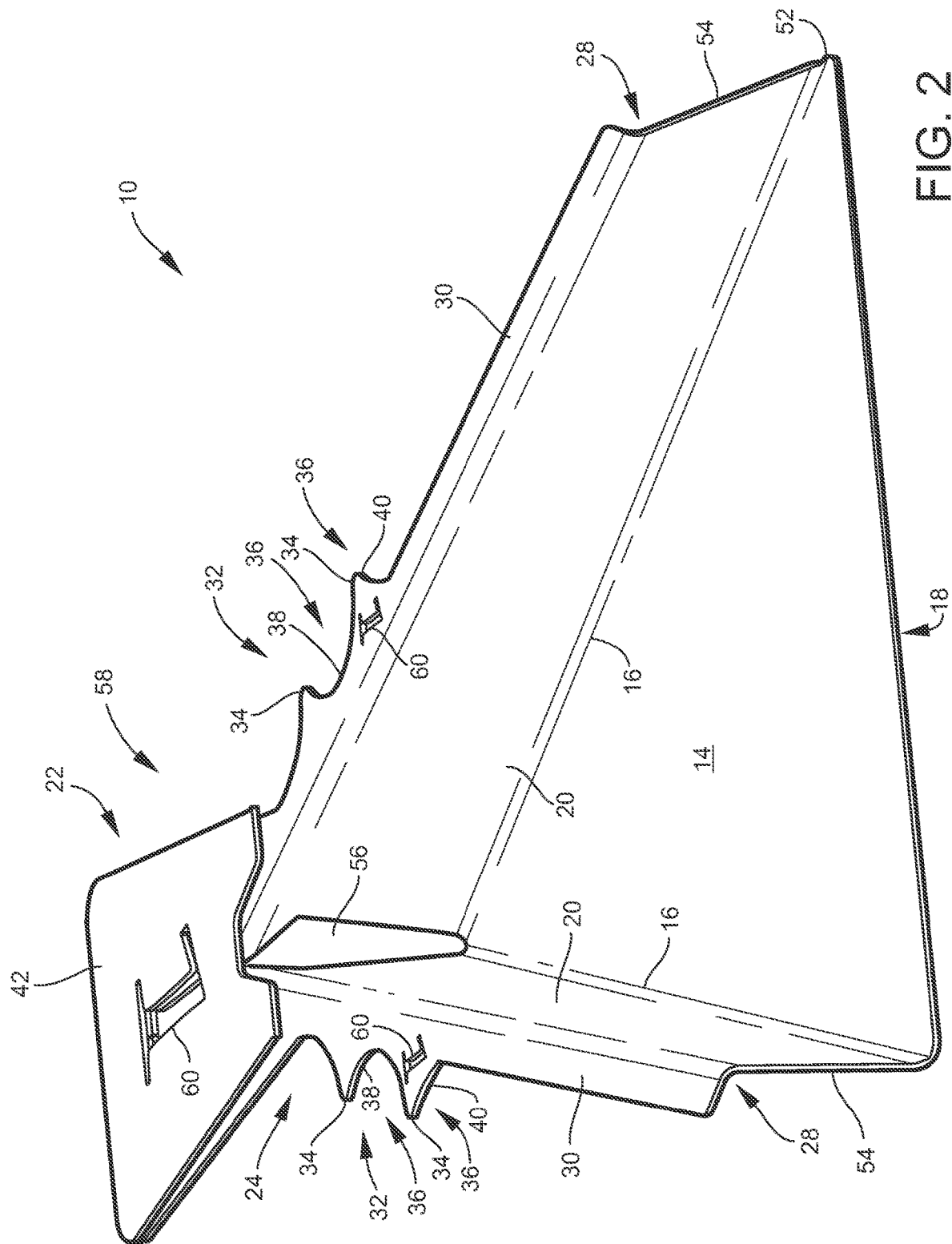
FIG. 2 is a bottom perspective view of the food preparation apparatus for sliced pizza of FIG. 1.
Figure 3:
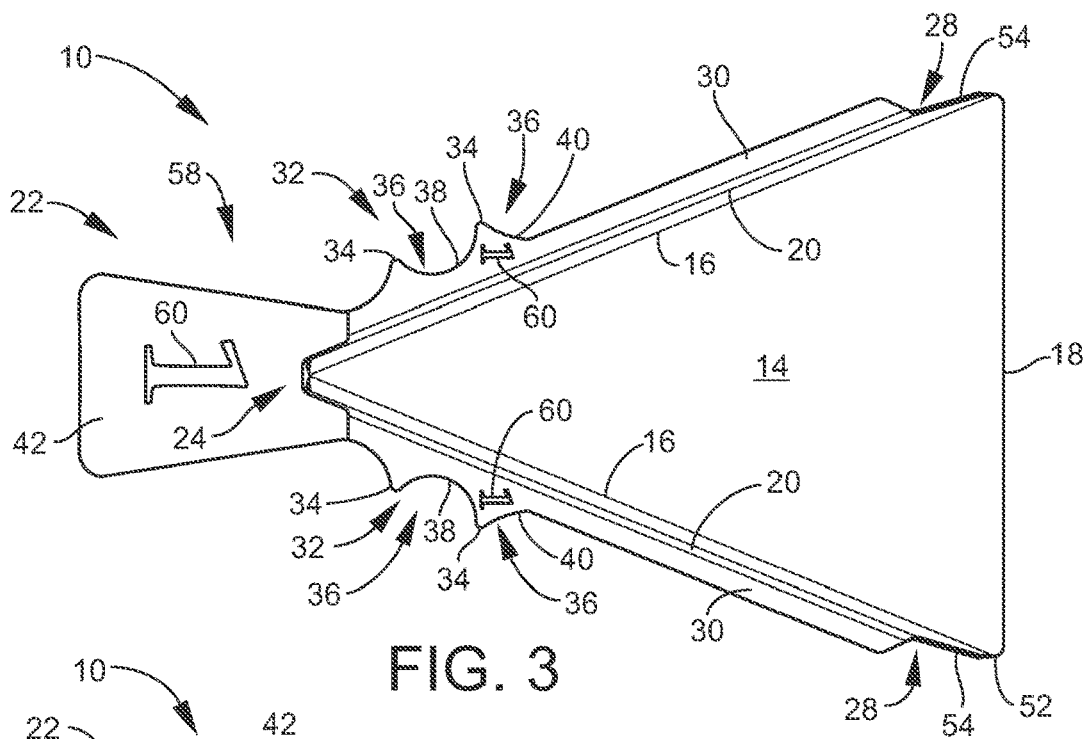
FIG. 3 is a top view of the food preparation apparatus for sliced pizza of FIG. 1.
Figure 4:
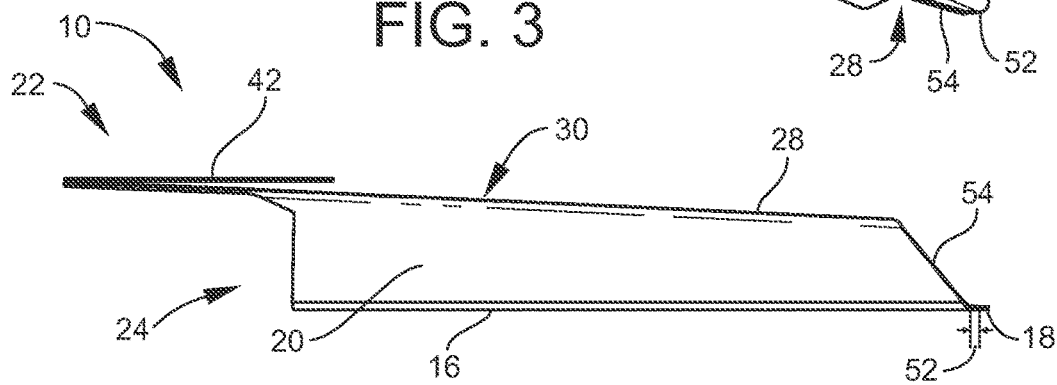
FIG. 4 is a left or right side view of the food preparation apparatus for sliced pizza of FIG. 1.
Figure 5:
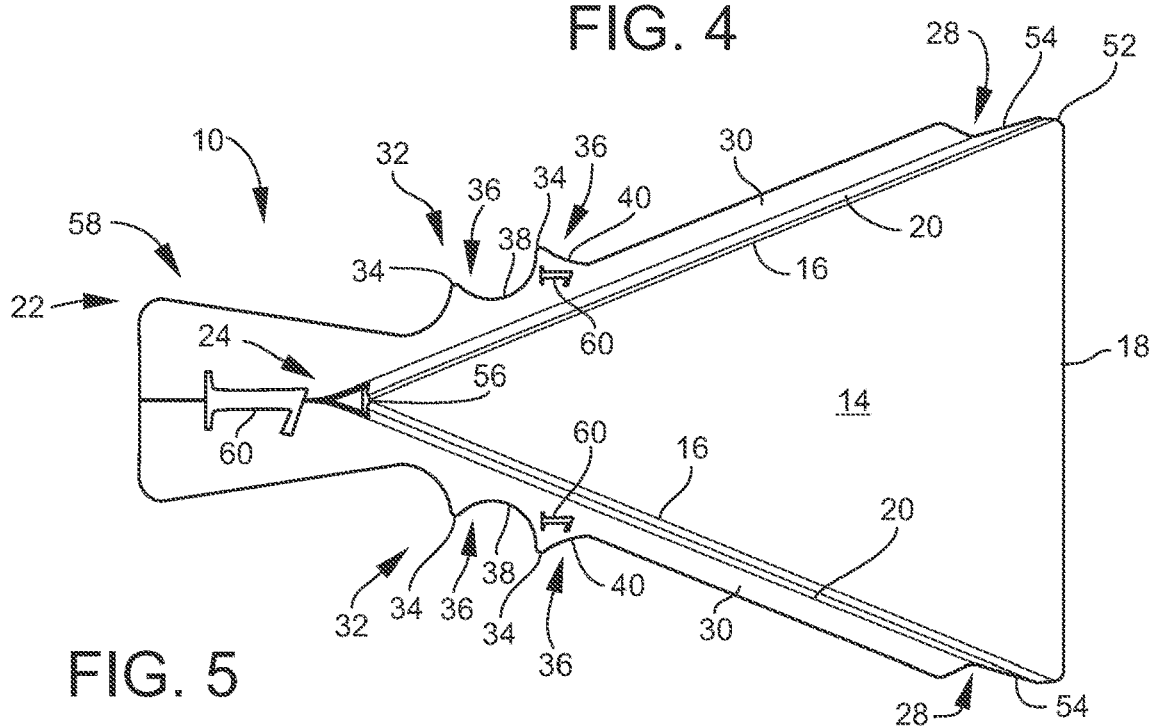
FIG. 5 is a bottom view of the food preparation apparatus for sliced pizza of FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-13, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-12, in a possibly preferred embodiment, the present disclosure overcomes the above-mentioned disadvantages and meets the recognized need for such an apparatus or method by providing of food preparation apparatus 10 for sliced pizza 12. Food preparation apparatus 10 may be for containing any food, like pizza, while cooking, baking, heating, the like, etc. As such, although specifically directed herein as a food preparation apparatus, food preparation apparatus 10 is not so limited and may be used for containing, cooking, baking, re-heating other foods or the like, including, but not limited to, any pies. Food preparation apparatus 10 generally may include flat bottom 14 with raised side members 20. Flat bottom 14 may be shaped like slice of pizza 12 with two angled sides 16 and an open end 18. As pizza slices may vary in size from any piece of the pie, i.e. 0-360 degrees, the shape of flat bottom 14 may likely vary to any desired shape or size of slice of pizza 12. Open end 18 may connect two angled sides 16. Open end 18 may also be straight, i.e. open end 18 may provide for a flat outer surface. This may be different from the crust of pizza slice 12, as it may be rounded. However, the flat outer surface provided by open end 18 being straight may provide for a scooping surface for spatula 50, as discussed below. Raised side members 20 may be on two angled sides 16. Raised side members 20 may be configured for holding pizza slice 12 and its toppings 26 on food preparation apparatus 10. Handle 22 may be positioned off of point 24 created by two angled sides 16. Wherein, food preparation apparatus 10 may be configured to hold slice of pizza 12 on bottom 14 where raised side members 20 may be configured to retain slice of pizza 12 and toppings 26 on food preparation apparatus 10.

Handle 22 may be included with food preparation apparatus 10. Handle 22 may be for holding, handling, and manipulating, etc. food preparation apparatus 10 with or without sliced pizza 12. Handle 22 may be positioned off of point 24 created by two angled sides 16. As such, handle 22 may protrude off of point 24 directly opposite of open end 18. In select embodiments of food preparation apparatus 10, handle 22 may be positioned at tops 28 of raised side members 20 off of point 24 created by two angled sides 16. These tops 28 of raised side members 20 may include edges 30. Edges 30 on each of tops 28 may extend outwardly from bottom 14. In select embodiments, one or more of edges 30 may include grip portions 32 associated with handle 22. Grip portions 32 may be configured to aid in holding handle 22 and food preparation apparatus 10. In select embodiments, each grip portions 32 may include at least one extended ridge 34 from each edge 30 approximate handle 22, where the at least one extended ridge 34 may be configured to aid in holding handle 22 by providing at least one finger grip 36. In select embodiments, each of grip portions 32 may include two extended ridges 34 from each edge 30 approximate handle 22. As such, the two extended ridges 34 may be configured to aid in holding handle 22 by providing two finger grips 36. As shown in the Figures, in select embodiments, the two finger grips 36 may be provided by the two extended ridges 34 of each of the grip portions 32 creating full concave portion 38 between each extended ridge 34 and half concave portion 40. Half concave portion 40 may be provided on the opposite side of the farthest extended ridge 34 from handle 22. The finger grip 36 or two finger grips 36 (as shown in the Figures) may be included on both angled sides 16 so that handle 22 can be gripped with either the right hand or the left hand of the user.

Cap 42 may also be included in select embodiments of food preparation apparatus 10 for sliced pizza 12. Cap 42 may be for joining the two sections of handle 22 together. Cap 42 may also be for aiding in gripping handle 22 and/or for insulating heat from food preparation apparatus 10 to handle 22. Cap 42 may cover handle 22, including the top of handle 22. Cap 42 may be configured to aid in gripping handle 22 and may be configured for insulating heat from handle 22. In select embodiments, cap 42 may be integral with food preparation apparatus 10 and handle 22, as shown in the Figures, where cap 42 is just folded over on top of handle 22. In other select embodiments, cap 42 may be added or inserted over handle 22, like a rubber or the like cover covering inserted over handle 22. In select embodiments, cap 42 may include unique number 60 of numbering system 58.

Figure 8:
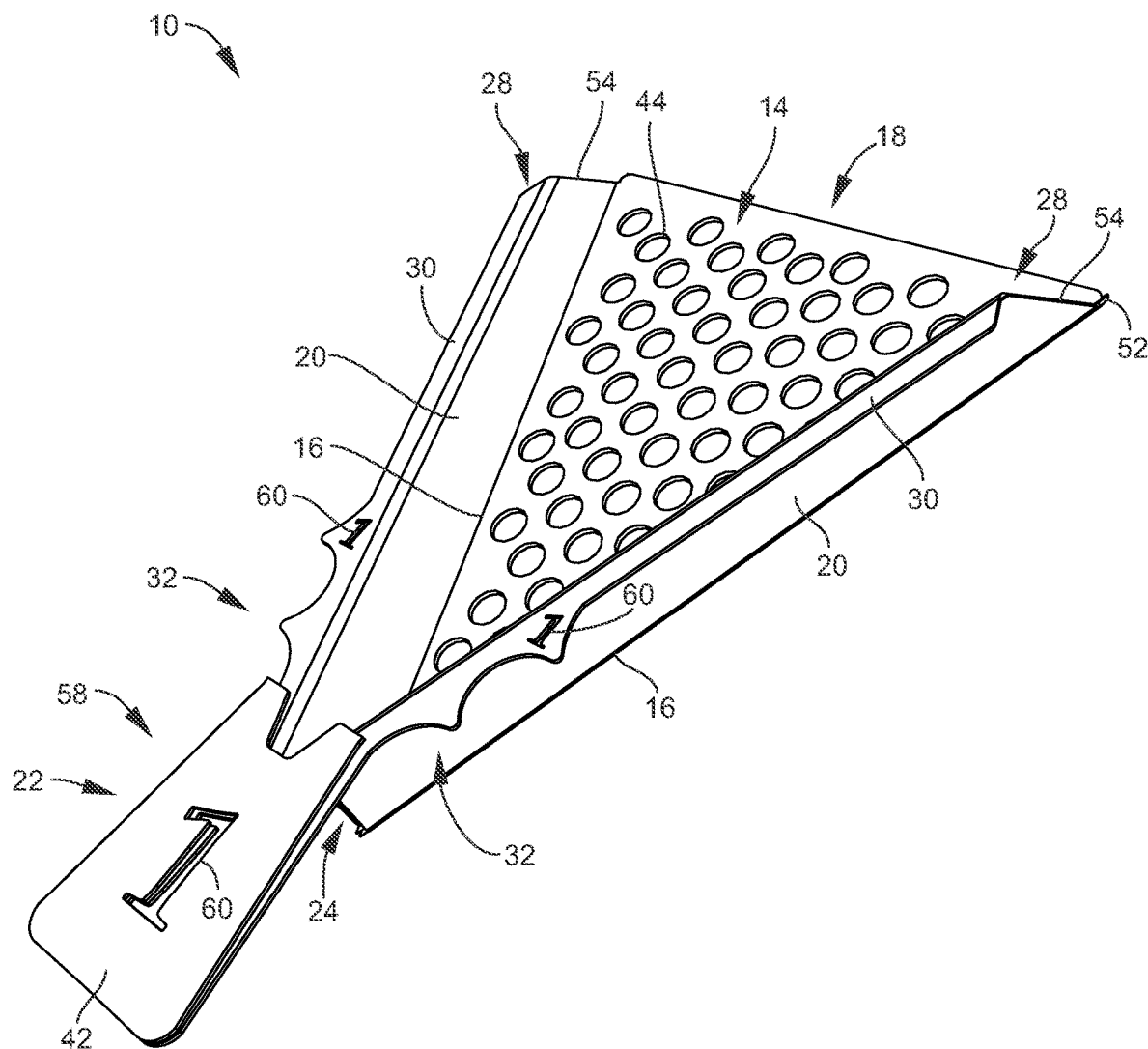
FIG. 8 is a top perspective view of the food preparation apparatus for sliced pizza according to select embodiments of the instant disclosure with holes in the bottom.
Figure 9:
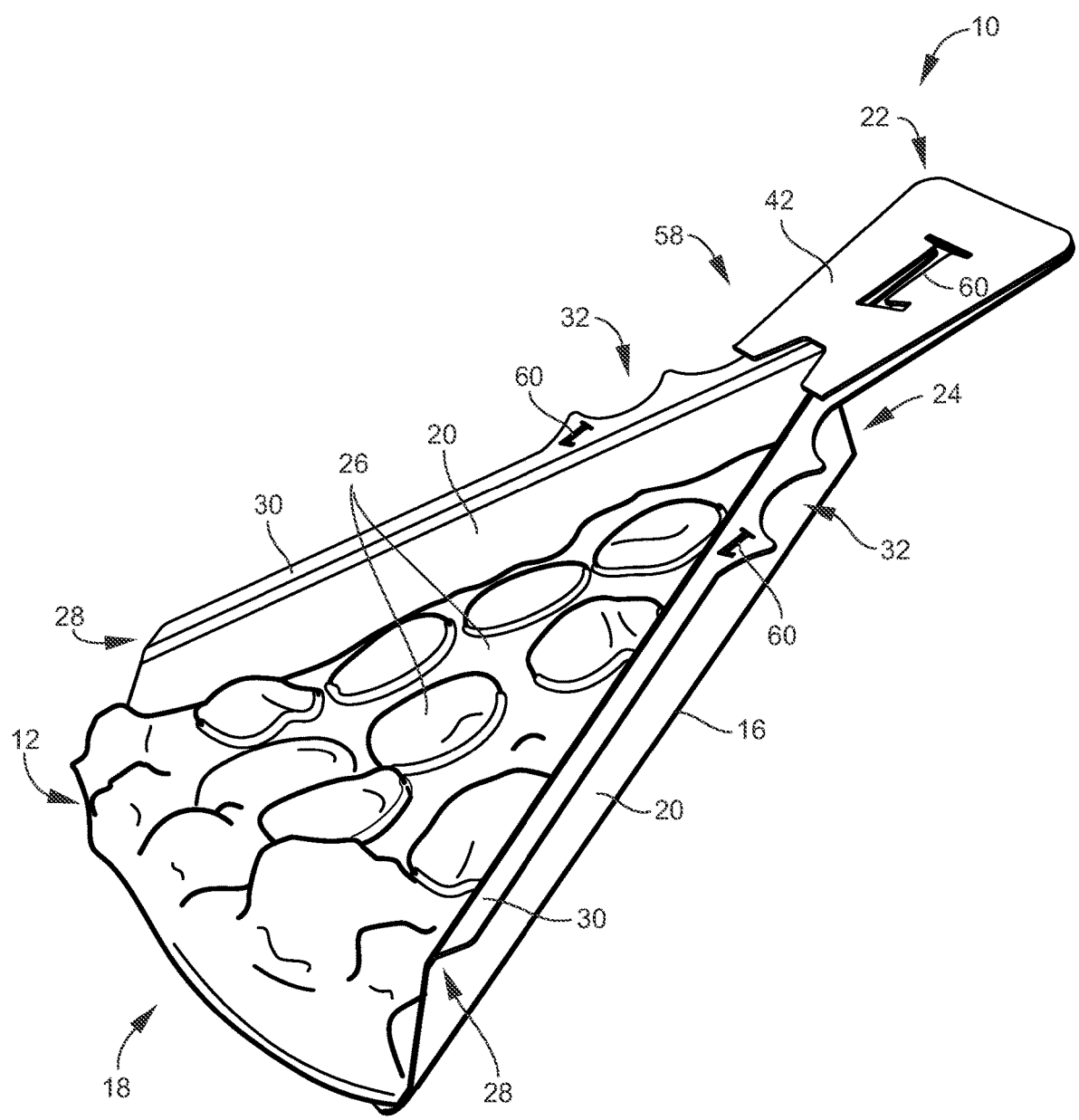
FIG. 9 is a top perspective environmental view of the food preparation apparatus for sliced pizza according to select embodiments of the instant disclosure with a slice of pizza positioned on the tin.

Referring now specifically to FIG. 8, in select embodiments of food preparation apparatus 10 for slice of pizza 12, flat bottom 14 may include plurality of holes 44. Plurality of holes 44 may be in flat bottom 14 and thus configured for ventilation to aid in cooking, baking or reheating of the slice of pizza 12. Holes 44 may be any size, shape, or number of desired holes in bottom 14. As shown in FIG. 8, in select embodiments, holes 44 may be circular holes equally spaced throughout bottom 14.

Figure 10:
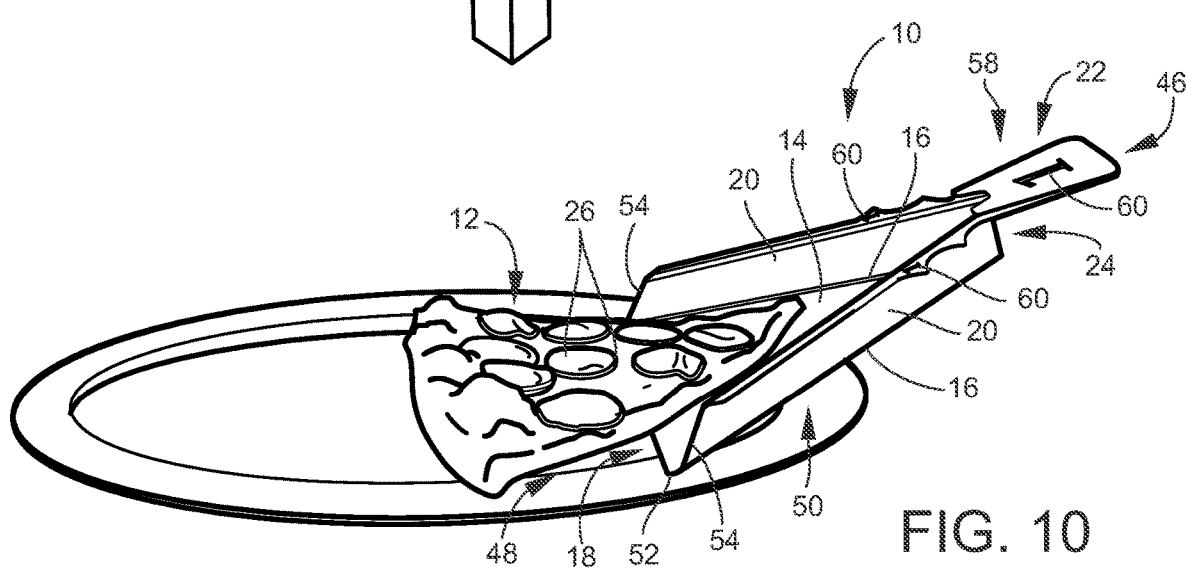
FIG. 10 is a top perspective environmental view of the food preparation apparatus for sliced pizza according to select embodiments of the instant disclosure scooping a slice of pizza from a dish with the open spatula end.

Referring now specifically to FIG. 10, another feature of food preparation apparatus 10 for slice of pizza 12 may be that it can be configured and used like spatula 50. As shown, the combination of open end 18 positioned on front side 46 of food preparation apparatus 10 and handle 22 positioned on back side 48 of food preparation apparatus 10 may create spatula 50. As such, spatula 50 created by food preparation apparatus 10 may be configured to scoop slice of pizza 12 into food preparation apparatus 10 by pushing open end 18 under a pointed end of slice of pizza 12, as shown in FIG. 10. In select embodiments, open end 18 may include lip 52 extending from raised side members 20. In other select embodiments, each of raised side members 20 may include angled side 54 approximate open end 18. The combination of lip 52 and angles sides 54 of raised side members 20 may allow for scooping with open font end 18 at various angles and orientations.

Figure 6:
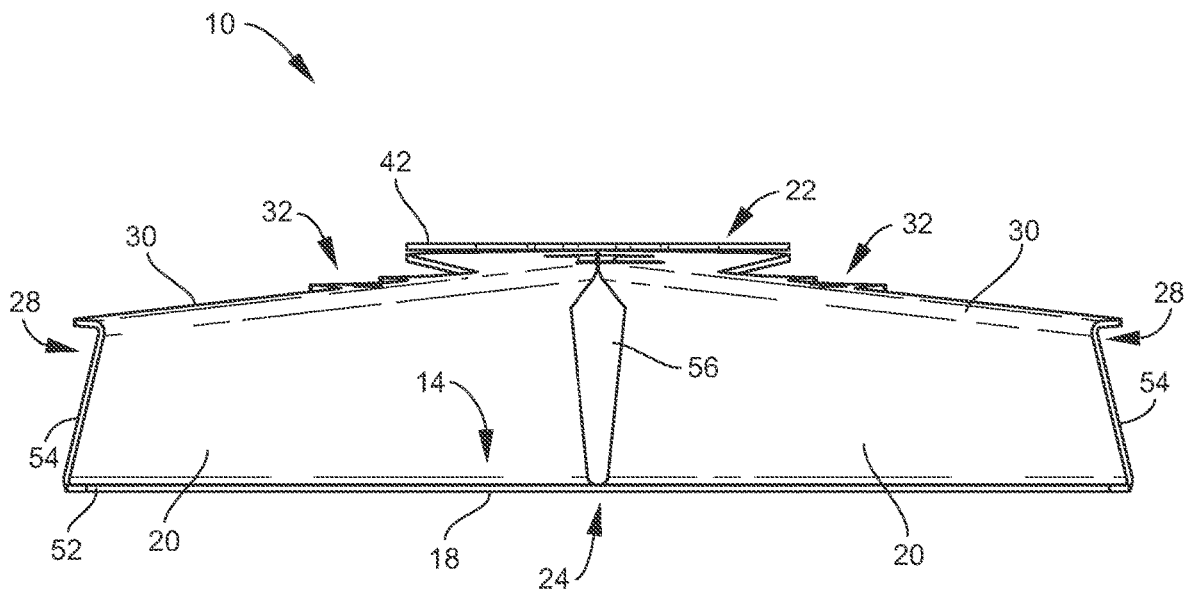
FIG. 6 is a front view of the food preparation apparatus for sliced pizza of FIG. 1.
Figure 7:
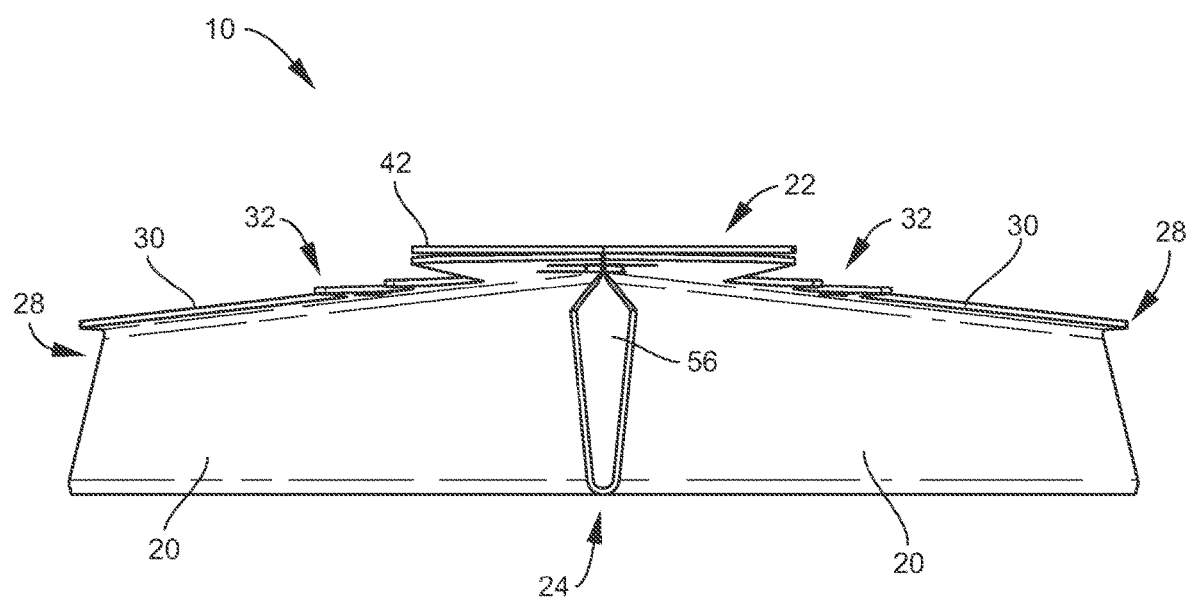
FIG. 7 is a rear view of the food preparation apparatus for sliced pizza of FIG. 1.

As best shown in FIGS. 6 and 7, another feature of food preparation apparatus 10 for slice of pizza 12 may be the inclusion of opening 56. Opening 56 may be for ventilation and/or drainage from food preparation apparatus 10. As shown, raised side members 20 can include opening 56 out of point 24 created by two angled sides 16. As such, opening 56 at point 24 may be configured for ventilation and/or drainage from food preparation apparatus 10.

As shown throughout the Figures, another feature of food preparation apparatus 10 for slice of pizza 12 may be the inclusion of numbering system 58. Numbering system 58 may be for identifying and keeping track of various food preparation apparatuses 10 with various slices of pizza 12 as they are cooked, baked, re-heated, or the like. Numbering system 58 may include at least one unique number mark 60 positioned anywhere on food preparation apparatus 10, like on handle 22 or one of edges 30. This unique number mark 60, like numbers 1-9 or more, may be configured for keeping track of slice of pizza 12 on food preparation apparatus 10.

Figure 11:
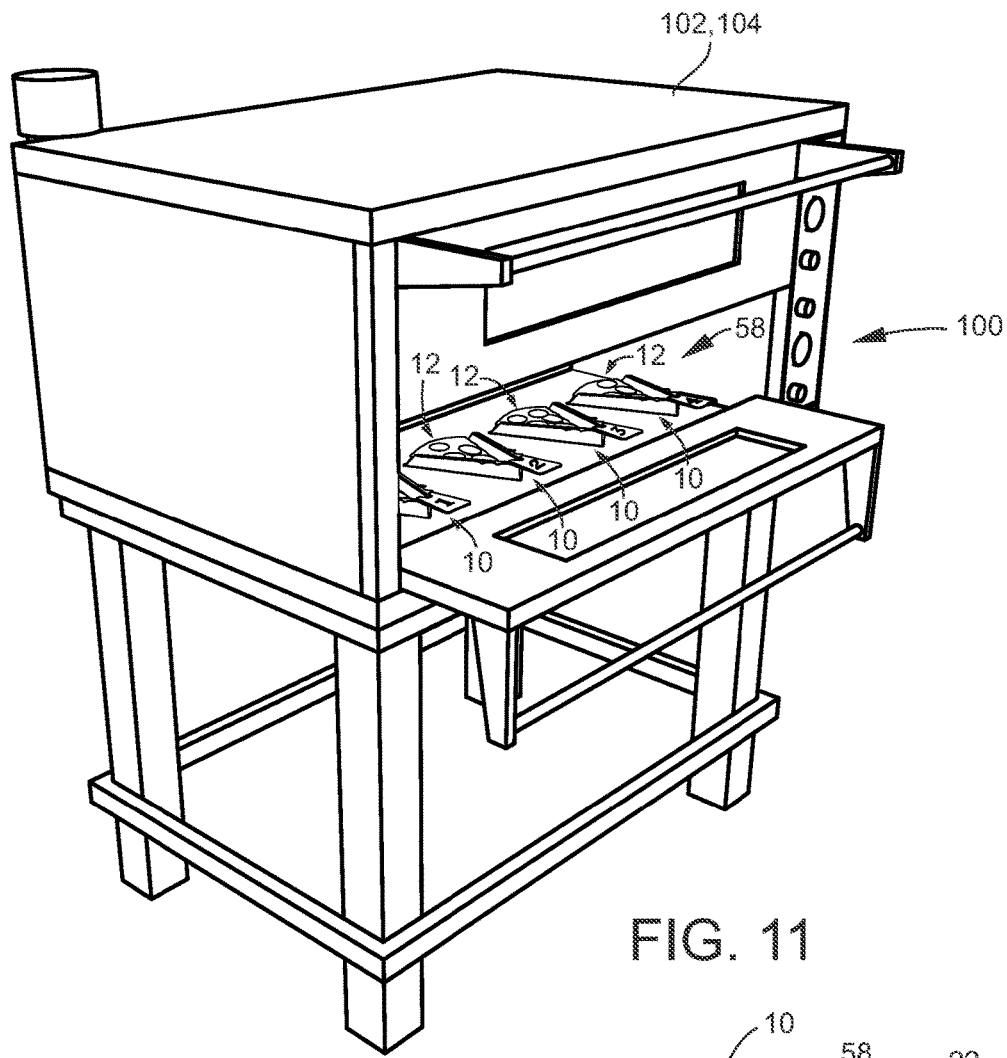
FIG. 11 is an environmental perspective view of multiple food preparation apparatuses for sliced pizza according to select embodiments of the instant disclosure cooking, baking, or re-heating slices of pizza in a standard oven.
Figure 12:
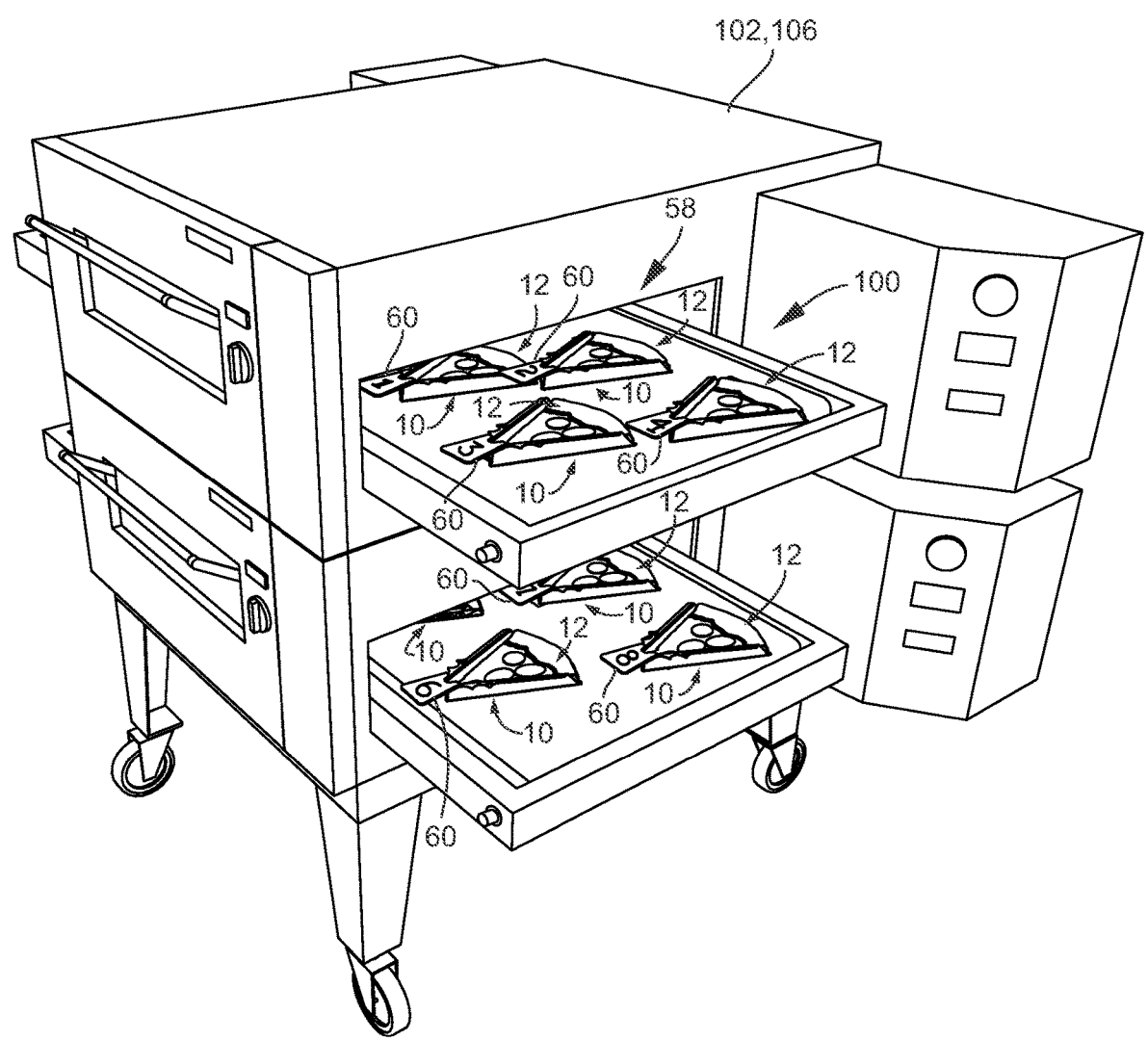
FIG. 12 is an environmental perspective view of multiple food preparation apparatuses for sliced pizza according to select embodiments of the instant disclosure cooking, baking, or re-heating slices of pizza in a conveyor oven.

Referring now specifically to FIGS. 11 and 12, in another aspect, the instant disclosure embraces set 100 of food preparation apparatuses 10 for sliced pizza 12. Set 100 of food preparation apparatuses 10 may include a plurality of food preparation apparatuses 10 for slice of pizza 12 in any of the various embodiments shown and/or described herein. As such, each of the plurality of food preparation apparatuses 10 may include numbering system 58 for the plurality of food preparation apparatuses 10. Numbering system 58 may include at least one unique number mark 60 positioned on each of the plurality of food preparation apparatuses 10. As such, each of the various food preparation apparatuses 10 may include a varying or unique number mark 60. For example, a first food preparation apparatus of the set 100 may include the number '1' for unique number mark 60, a second food preparation apparatus 10 of the set 100 may include the number '2' for unique number mark 60, a third food preparation apparatus 10 of the set 100 may include the number '3' for unique number mark 60, and so forth. As such, numbering system 58 may be configured for keeping track of sliced pizza 12 in each of the plurality of food preparation apparatuses 10. In select embodiments of set 100 of food preparation apparatuses 10 for sliced pizza 12, each of the food preparation apparatuses 10 may include handle 22, wherein the at least one unique number mark 60 may be positioned on handle 22. In other select embodiments, each of the food preparation apparatuses 10 may include edges 30 on tops 28 of raised side members 20, where the at least one unique number mark 60 may be positioned on one or both edges 30. In other select embodiments, each of the food preparation apparatuses 10 may include unique number mark 60 positioned on handle 22 and each of edges 30, as shown in the Figures. One feature of the instant set 100 of food preparation apparatuses 10 for sliced pizza 12 may be that numbering system 58 can be configured for keeping track of sliced pizza 12 in each of the plurality of food preparation apparatuses 10 while it is cooked, baked or reheated in oven 102. Oven 102 may be any oven for cooking, baking, re-heating, or the like sliced pizza 12. As shown in FIG. 11, in select embodiments, oven 102 may be standard oven 104 where numbering system 58 may help keep track of sliced pizza 12 as it is placed inside standard oven 104 in food preparation apparatuses 10 and the door is shut. As shown in FIG. 12, in other select embodiments, oven 102 may be conveyor oven 106 where numbering system 58 may help keep track of sliced pizza 12 as it is moved through conveyor oven 106 by the conveyor system. Oven 102 may also include a hearth stone or the like for cooking, baking, reheating, or the like, slice 12 in food preparation apparatus 10.

Figure 13:
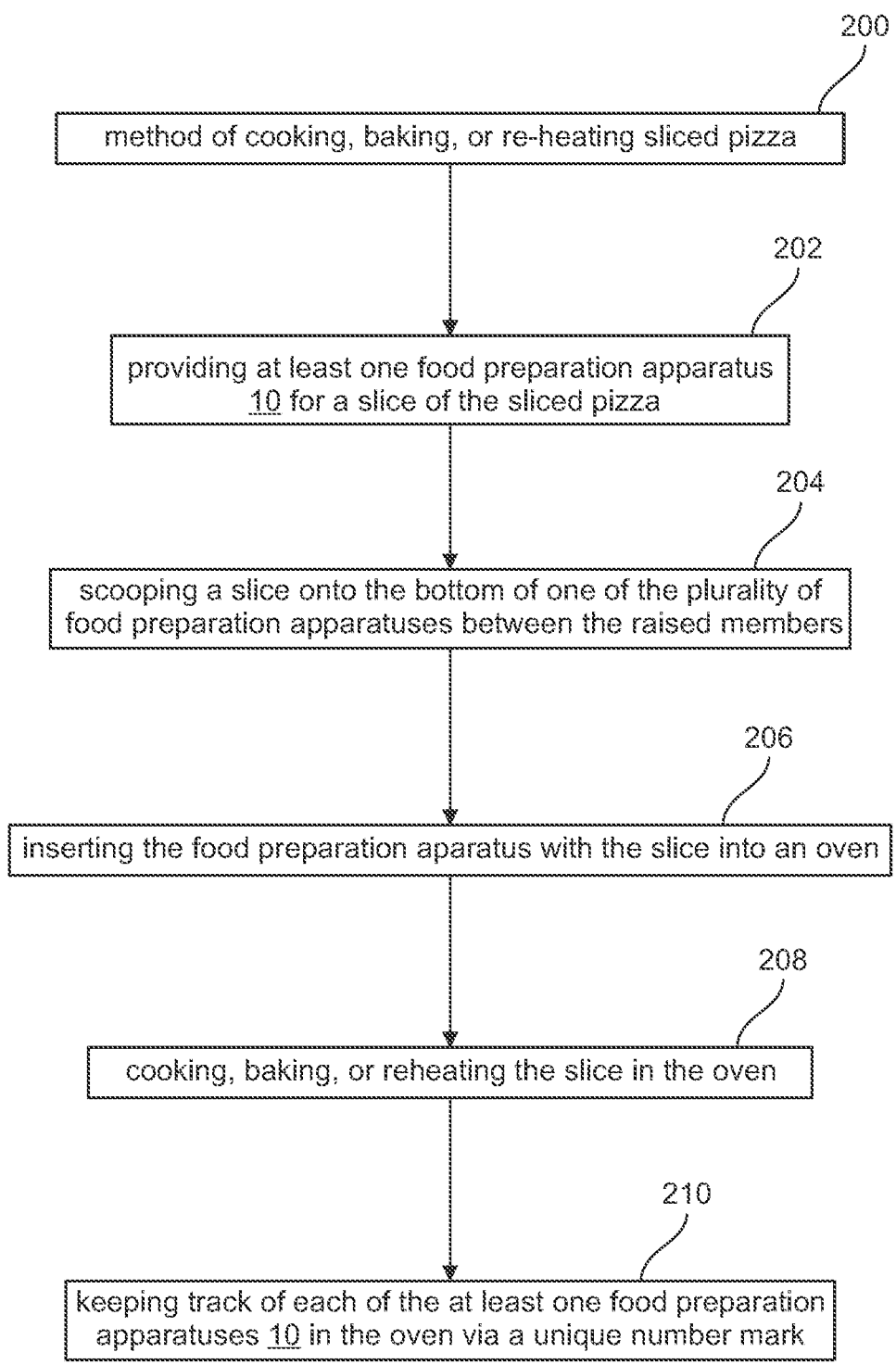
FIG. 13 is a flow chart of the method of cooking, baking, or re-heating sliced pizza according to select embodiments of the instant disclosure.

Referring now to FIG. 13, in another aspect, the instant disclosure embraces method 200 of cooking, baking, or re-heating sliced pizza 12. Method 200 of cooking, baking, or re-heating sliced pizza 12 may generally include step 202 of providing at least one food preparation apparatus 10 for slice 12 of the sliced pizza in any of the various embodiments shown and/or described herein. As such, the provided food preparation apparatus 10 or tins 10 may generally include flat bottom 14 shaped like slice 12 with two angled sides 16 and open end 18 connecting two angled sides 16. Open end 18 may be straight. Raised side members 20 may be on the two angled sides 16. Wherein, the provided food preparation apparatus 10 may be configured to hold slice 12 on bottom 14 where raised side members 20 may be configured to retain slice 12 and toppings 26 on food preparation apparatus 10. With this provided food preparation apparatus 10 or these provided food preparation apparatuses 10, method 200 may further include: step 204 of scooping slice 12 onto bottom 14 of one of the plurality of food preparation apparatuses 10 between raised side members 20; step 206 of inserting food preparation apparatus 10 with slice 12 into oven 102; and step 208 of cooking, baking, or reheating slice 12 in oven 102 on food preparation apparatus 10. In select embodiments of method 200 of cooking, baking, or re-heating sliced pizza 12, wherein the at least one food preparation apparatus 10 further includes the numbering system 58 for each of the at least one food preparation apparatuses 10, where the numbering system includes at least one unique number mark 60 positioned on each of the plurality of food preparation apparatuses 10, numbering system 58 may be configured for keeping track of the sliced pizza 12 in each of the at least one food preparation apparatuses 10, wherein, method 200 of cooking, baking, or re-heating sliced pizza 12 may further include step 210 of keeping track of each of the at least one food preparation apparatuses 10 in oven 102 via unique number mark 60.

In sum, the present disclosure is directed toward food preparation apparatus 10 shaped in the form of slice 12 in order to contain toppings 26, like cheese, while cooking. Food preparation apparatus 10 may be a pizza tin designed to shorten cook time of pizza pies because of less mass. Handle 22 may add ease when using, while the flat open end 18 is ideal for scooping and sliding out slice of pizza 12. Food preparation apparatus 10 is the shape of slice of pizza 12 and could be any angle from as thin as a slice you can cut to 179 degrees. Raised side members 20 go up as high as needed to wedge slice of pizza 12 in place while cooking. Open end 18 is flat to provide for spatula 50 for easy transfer of slices in and out of food preparation apparatus 10. In select embodiments, handle 22 may be incorporated in the design for easy handling. However, the disclosure is not so limited, and embodiments without handle 22 may be desired. In other select embodiments, numbering system 58 may be incorporated into food preparation apparatus 10 for keeping track of slice of pizza 12 as it is heated or baked in oven 102, like standard oven 104 or conveyor belt type of oven 106. For example, number system 58 may include the numbers 1-9, or the like, printed on cap 42 for handle 22. Food preparation apparatus 10 of the instant disclosure may be made from any desired materials. In select embodiments, food preparation apparatus 10 may be made from a metallic material for cooking, baking or heating in ovens, like aluminum, stainless steel, silicone, or the like, thereby making food preparation apparatus 10 a pizza tin type of device. In other select embodiments, food preparation apparatus 10 may be made from disposable materials for consumer packaged goods like frozen pizza.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A food preparation apparatus for a slice comprising:
a flat bottom shaped like the slice with two angled sides, a front side, and a rear side, and a flat open end connecting the two angled sides on the front side, said flat open end being straight, and a substantially pointed open end on the rear side, the substantially pointed end forming an opening at an apex of the two angled sides, and a handle extending from the substantially pointed open end in a direction opposite the flat open end, the handle further comprising a cap formed integrally with the handle such that the cap is one of coupled to the handle or formed by a fold in the handle at a location opposite the flat open end;
raised side members on the two angled sides, the handle formed from flange members extending from the raised side members, wherein the flange members are parallel to the flat open end and the opening formed by the two angled sides defined by a bottom terminating at a junction of the two angled sides and a top terminating at a junction of the raised side members, and wherein the handle further extends over the opening formed by the two angled sides;
wherein, the food preparation apparatus is configured to hold the slice on the bottom where the raised side members are configured to retain the slice and toppings on the food preparation apparatus, and wherein the food preparation apparatus is formed of metal and further comprising a flat handle positioned off of a point created by the two angled sides, wherein the handle being positioned at tops of the raised side members off of the point created by the two angled sides, and extending beyond the food preparation apparatus in a direction opposite the flat open end, wherein the tops of the raised side members including edges extending outwardly from the bottom, said edges including a plurality of grip portions having a plurality of finger grips associated with the handle, said grip portions being configured to aid in holding the handle, wherein each of the grip portions including at least one extended ridge from the outwardly extending edge of the raised side member approximate the handle, where the at least one extended ridge is configured to aid in holding the handle by providing at least one finger grip, wherein each of the grip portions including two extended ridges from the outwardly extending edge of the raised side member approximate the handle, where the two extended ridges are configured to aid in holding the handle by providing two finger grips, wherein the two finger grips are provided by the two extended ridges of each of the grip portions creating a full concave portion between each extended ridge and a half concave portion.

2. The food preparation apparatus of claim 1, wherein the flat bottom further comprising a plurality of holes configured for ventilation.

3. The food preparation apparatus of claim 1, wherein the open end positioned on a front side of the food preparation apparatus in combination with a handle positioned on a back side of the food preparation apparatus, protruding away from the front side, creating a spatula, whereby the spatula is configured to scoop the slice into the food preparation apparatus by pushing the open end under a pointed end of the slice.

4. The food preparation apparatus of claim 3, wherein the open end including a lip extending from the raised side members.

5. The food preparation apparatus of claim 3, wherein each of the raised side members including an angled side approximate the open end.

6. The food preparation apparatus of claim 1 further comprising a numbering system, said numbering system including at least one number mark positioned on the handle or one of the flange members, said unique number mark being configured for keeping track of the slice on the food preparation apparatus.

* * * * *